UNITED STATES PATENT OFFICE.

CHESTER J. RANDALL, OF NAUGATUCK, CONNECTICUT, ASSIGNOR TO BOSTON RUBBER SHOE COMPANY, A CORPORATION OF MASSACHUSETTS.

PROCESS OF VULCANIZING PLASTICS.

1,213,905. Specification of Letters Patent. Patented Jan. 30, 1917.

No Drawing. Application filed May 13, 1915. Serial No. 27,749.

*To all whom it may concern:*

Be it known that I, CHESTER J. RANDALL, a citizen of the United States, and a resident of Naugatuck, county of New Haven, and State of Connecticut, have invented certain new and useful Improvements in the Process of Vulcanizing Plastics, of which the following is a full, clear, and exact description.

This invention relates to processes for vulcanizing plastics and is more particularly directed to a process for vulcanizing plastics which are apt to blow during vulcanization.

It is well known in the rubber industry that it is impossible to finish the cure of certain rubber compounds, such as for instance a mixture lacking an active mineral curing agent for example a compound known in the trade as "white stock," without the use of wet steam in contact therewith. However, even with the use of steam in contact with the articles formed of the "white stock," such as for instance soles for boots and shoes, the vulcanized product has hitherto been imperfect due to blowing or the formation of chambers, cells, or the like in the rubber. This blowing is caused principally because steam at the temperature necessary for efficient vulcanization has insufficient pressure to restrain the rubber from inflating under the pressure of the gases, fluids, and the like entrapped in the rubber which expand, if not prevented, under the influence of heat.

Experiment has proved that a pressure of 60 lbs. is necessary during the initial stages of curing "white rubber" articles to prevent blowing. Saturated steam at 60 pounds pressure is too hot for vulcanizing such material and since the temperature of saturated steam for a given pressure is substantially a constant the pressure may not be reduced while maintaining the temperature constant. The temperature of air on the other hand for a given pressure is a variable and air may be brought to any desired temperature for vulcanization at a required pressure. However, it is common knowledge that the cure of "white rubber" containing articles cannot be finished by heated compressed air although the air may be used during the initial stages of the cure with satisfactory results.

With the above in mind the present embodiment of my invention consists in subjecting the vulcanizable "white rubber" soles to air at a vulcanizing temperature and under 60 lbs. pressure until the soles have reached a desired degree of vulcanization, and subsequently subjecting the soles to steam under vulcanizing temperature and 30 lbs. pressure to complete the cure, the interim between the change from air to steam being utilized in cooling the hot soles while simultaneously maintaining a sufficient pressure to keep them from blowing under the cooling or reduced temperature. Broadly I subject the vulcanizable plastic in a closed chamber to a heat medium at a vulcanizing temperature under pressure, until the desired vulcanization is effected, and then admit into said chamber a cooling medium which makes contact with the hot rubber while the latter is under the influence of an external pressure.

In carrying out the embodiment of my invention in connection with the vulcanization of soles formed of "white rubber" stock, that is rubber lacking an active mineral curing agent, the soles are inclosed in a vulcanizer and air at atmospheric temperature and at 60 lbs. pressure is introduced into the vulcanizer. This compressed air is heated by means of the usual steam coils in the vulcanizer for a period of about one-half hour until it attains the vulcanizing temperature of about 270°. It is maintained at approximately this temperature for about one-half hour or until the stock has reached a desired degree of vulcanization, that is, is partially cured. The outlet is then opened for the exit of the compressed air and cold air or air at atmospheric temperature is blown through the vulcanizer in contact with the soles at substantially the same pressure *i. e.* 60 lbs., the steam being simultaneously shut off and permitted to escape from the coils so that the cooling medium may exert its maximum efficiency.

The cold air blast is continued for about ten minutes under a pressure of 60 lbs. and during this period the temperature of the interior of the vulcanizer is reduced by the blast from 270° to 250° F., or falls about 20°. The 60 lbs. pressure of the air during this cooling step positively holds the soles against blowing, that is holds the rubber against yielding under the pressure of the entrapped gases, fluids, and the like, the pressure of such gases, fluids, and the like of course dropping with the drop in temperature so that at the end of the ten minute period in which the air blast is employed the pressure of such entrapped gases, fluids, and the like will be so reduced that the pressure of the air blast may be reduced considerably without danger of the rubber blowing. Moreover, cooling the stock so stiffens it as to enable it to withstand considerable internal pressure. At the end of the ten minute period above referred to, the pressure of the air blast is reduced from 60 lbs. to 30 lbs. and now steam under a pressure of 30 lbs. and under a temperature sufficient to complete the vulcanization is introduced into the vulcanizer and maintained preferably from 10 to 20 minutes or for a period sufficient to complete the cure, the pressure being gradually reduced during this period to atmospheric. The vulcanizer may now be opened and the articles removed in the usual manner.

While in the above specification I have referred specifically to the vulcanization of rubber, the invention in its broadest aspect contemplates the treatment of any vulcanizable plastic, including gutta percha, balata, and the like, which although not commonly vulcanized are capable of vulcanization or setting.

Having thus described my invention, what I claim and desire to protect by Letters Patent is:

1. The process of vulcanizing rubber or similar material which comprises, partially vulcanizing the rubber under a pressure sufficient to prevent blowing of the rubber, cooling the rubber while maintaining it at a pressure sufficient to prevent blowing of the rubber, and completing the vulcanization under steam at a pressure less than that during partial vulcanization.

2. The process of vulcanizing rubber or similar material which comprises, partially vulcanizing the rubber in contact with a fluid vulcanizing medium under a pressure sufficient to prevent blowing, cooling the rubber under fluid pressure sufficient to prevent blowing of the rubber, and completing the vulcanization under steam at a pressure less than that during partial vulcanization.

3. The process of vulcanizing rubber or similar material which comprises, partially vulcanizing the rubber under heated air at a pressure sufficient to prevent blowing, subjecting the rubber to cool air at a pressure to prevent blowing of the rubber, and completing vulcanization under pressure less than that during partial vulcanization.

4. The process of vulcanizing rubber or similar material which comprises, partially vulcanizing the rubber under heated air at a pressure sufficient to prevent blowing, subjecting the rubber to cool air at a pressure to prevent blowing of the rubber, and completing vulcanization under steam at a vulcanizing temperature.

5. The process of treating vulcanizable rubber stock consisting of partially curing the stock in contact with air at a vulcanizing temperature and pressure, cooling the partially vulcanized stock under sufficient pressure to prevent blowing of the stock while cooling, and completing the cure of the stock in contact with wet steam at a vulcanizing temperature and pressure.

6. The process of vulcanizing rubber or similar material which comprises, partially vulcanizing the rubber in contact with air at approximately 60 lbs. pressure, cooling the rubber under air at approximately 60 lbs. pressure, and completing the vulcanization of the rubber under steam at a lower pressure than that during partial vulcanization.

7. The process of vulcanizing rubber or similar material which comprises, partially vulcanizing the rubber in contact with air at approximately 60 lbs. pressure, cooling the rubber under approximately 60 lbs. pressure, and completing the vulcanization of the rubber under steam at approximately 30 lbs. pressure.

Signed at Naugatuck, county of New Haven, State of Conn., this 11th day of May, 1915.

CHESTER J. RANDALL.